United States Patent
Won et al.

(10) Patent No.: US 9,036,721 B2
(45) Date of Patent: *May 19, 2015

(54) WIRELESS COMMUNICATION METHOD FOR MAGNETIC FIELD COMMUNICATION NETWORK AND DEMODULATION DEVICE OF COORDINATOR

(75) Inventors: Yun-jae Won, Gyeonggi-do (KR); Seung-ok Lim, Gyeonggi-do (KR); Sun-hee Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 276 days.

This patent is subject to a terminal disclaimer.

(21) Appl. No.: 13/254,749

(22) PCT Filed: May 27, 2009

(86) PCT No.: PCT/KR2009/002814
§ 371 (c)(1),
(2), (4) Date: Sep. 2, 2011

(87) PCT Pub. No.: WO2010/101330
PCT Pub. Date: Sep. 10, 2010

(65) Prior Publication Data
US 2012/0002761 A1 Jan. 5, 2012

(30) Foreign Application Priority Data
Mar. 5, 2009 (KR) .................. 10-2009-0018693

(51) Int. Cl.
*H04B 5/00* (2006.01)
(52) U.S. Cl.
CPC .................... *H04B 5/0031* (2013.01)
(58) Field of Classification Search
USPC .......... 375/260, 267, 222; 370/236, 347, 330, 370/324, 338, 350, 503
See application file for complete search history.

(56) References Cited

U.S. PATENT DOCUMENTS 4,619,512 A * 10/1986 Kiyohara ................ 396/250
6,150,934 A   11/2000 Stiglic
(Continued)

FOREIGN PATENT DOCUMENTS

| CN | 101159689 A | 4/2008 |
| CN | 101194531 A | 6/2008 |

(Continued)

OTHER PUBLICATIONS

Korean Intellectual Property Office as International Searching Authority, International Search Report; PCT/KR2009/002814, 4 pages, Published: Sep. 10, 2010.

(Continued)

*Primary Examiner* — Shuwang Liu
*Assistant Examiner* — Ross Varndell

(57) ABSTRACT

Disclosed herein is a wireless communication method for a magnetic field communication network. The wireless communication method is performed by a coordinator on the magnetic field communication network. The wireless communication method includes transmitting a request signal used to request response to each of sensor nodes; selecting any one of response signals received from the sensor nodes; transmitting an acknowledgement signal to a sensor node corresponding to the response signal; selecting any one of response signals transmitted again from sensor nodes which did not receive the acknowledgement signal; and transmitting an acknowledgement signal to a sensor node corresponding to the selected response signal.

11 Claims, 14 Drawing Sheets

(56) References Cited

U.S. PATENT DOCUMENTS

| | | |
|---|---|---|
| 2006/0227729 A1 | 10/2006 | Budampati et al. |
| 2006/0238309 A1 | 10/2006 | Takatama .................. 340/10.41 |
| 2006/0273881 A1 | 12/2006 | Yang et al. .................. 340/10.2 |
| 2007/0025475 A1 | 2/2007 | Okunev |
| 2007/0115827 A1* | 5/2007 | Boehnke et al. ............. 370/236 |
| 2007/0232349 A1 | 10/2007 | Jones et al. |
| 2008/0186855 A1 | 8/2008 | Becker |
| 2008/0197982 A1* | 8/2008 | Sadr ............................ 340/10.4 |
| 2011/0038343 A1* | 2/2011 | Bhatti et al. ................. 370/330 |
| 2011/0268018 A1 | 11/2011 | Wang et al. |

FOREIGN PATENT DOCUMENTS

| | | | | |
|---|---|---|---|---|
| EP | 1768278 A1 | 3/2007 | | |
| EP | 1838063 A1 | 9/2007 | | |
| JP | 11-306297 | 11/1999 | ............ | G06K 17/00 |
| JP | 2000101472 A | 4/2000 | | |
| KR | 10-2006-0115689 A | 11/2006 | ............ | G06K 17/00 |
| KR | 10-0262450 B1 | 2/2007 | ............ | G06K 17/00 |
| KR | 10-0682450 B1 | 2/2007 | ............ | G06K 17/00 |
| KR | 100682450 B1 | 2/2007 | | |
| WO | 2008025245 A1 | 3/2008 | | |
| WO | 2008150122 A1 | 12/2008 | | |

OTHER PUBLICATIONS

Korean Intellectual Property Office as International Searching Authority, International Search Report; PCT/KR/2009/002814, 4 pages, Published: Nov. 24, 2010.

Korean Intellectual Property Office as International Searching Authority, Written Opinion of the International Search Report; PCT/KR/2009/002814, 6 pages, Mar. 26, 2010.

Chinese Patent Office, Office Action corresponding to CN Patent Application No. 200980157844.4 issued Aug. 26, 2013.

European Patent Office, Office Action corresponding to EP 09841192.9-1852/2405588, dated Jan. 29, 2015.

* cited by examiner

General frame structure

| byte: 1 | 2 | 2 | 2 | 1 | variable | 2 |
|---|---|---|---|---|---|---|
| MFAN ID | Frame control | Source Node ID | Destination Node ID | Sequence number | Payload | FCS (Frame Check Sequence) |
| MAC header | | | | | MAC payload | |

Frame control field

| bit: 0-2 | 3-4 | 5 | 6 | 7-8 | 9-15 |
|---|---|---|---|---|---|
| Frame type | ACK. method | First Fragment | Last Fragment | Protocol version | Reserved |

WIRELESS COMMUNICATION METHOD FOR MAGNETIC FIELD COMMUNICATION NETWORK AND DEMODULATION DEVICE OF COORDINATOR

PRIORITY

This application is a national phase entry of and claims priority from Patent Cooperation Treaty PCT/KR2009/002814, titled "Wireless Communication Method for Magnetic Field Communication Network And Demodulation Device Of Coordinator," filed May 27, 2009, which in turn claims priority from Korean patent application number 10-2009-0018693, filed Mar. 5, 2009, both of which are incorporated herein in their entirety by reference.

TECHNICAL FIELD

The present invention relates to a wireless communication method for a magnetic field communication network and the demodulation device of a coordinator.

BACKGROUND ART

FIG. 1. is a view illustrating the generation principle of electromagnetic waves.

As is generally known, when alternating voltage is applied to an antenna (for example, a dipole antenna), an electric field is generated and alternating current flows through the antenna, thereby generating a magnetic field. Here, when an electromagnetic field is separated from the antenna from a distance of $d(\lambda(\text{wavelength})2\pi)$, the electromagnetic field is changed into electromagnetic waves which propagate through space.

Here, a magnetic field area refers to the area from the antenna to a distance of $\lambda/2\pi$, and communication performed in such an area is referred to as magnetic field communication.

Unlike existing Radio Frequency Identification (RFID) technology and Ubiquitous Sensor Network (USN) technology, such magnetic field communication technology enables wireless communication to be performed around water, ground, and metal, and is a core technology which can overcome the limits of existing wireless communication technology.

Therefore, the present applicant achieved the present invention during the course of research into technology standards of magnetic field communication, which was being studied in order to increase national competitive power and preoccupy the world market through the national and/or international standardization associated with intellectual property related to magnetic field communication technology.

DISCLOSURE

Technical Problem

Accordingly, the present invention has been made keeping in mind the above problems occurring in the prior art, and an object of the present invention is to provide a wireless communication method for a magnetic field communication network and the demodulation device of a coordinator, which enable a plurality of sensor nodes to be detected.

Technical Solution

In order to accomplish the above object, the present invention provides a wireless communication method for a magnetic field communication network, the wireless communication method being performed by a coordinator on the magnetic field communication network, the wireless communication method including (a) transmitting a request signal used to request response to each of sensor nodes; (b) selecting any one of response signals received from the sensor nodes; (c) transmitting an acknowledgement signal to a sensor node corresponding to the response signal selected at (b); (d) selecting any one of response signals transmitted again from sensor nodes which did not receive the acknowledgement signal at (c); and (e) transmitting an acknowledgement signal to a sensor node corresponding to the response signal selected at (d).

It is preferable that the (b) include mixing the response signal received from the corresponding sensor node with a clock signal; integrating a resulting signal on which mixing was performed; comparing a current integration value, which is the result of integration at a integration step, with an integration value previous to the current integration value in every ½ data symbol period of the resulting signal; and determining output data based on the result of comparison.

Further, it is preferable that the (a) be performed during the request period of a data transmission/reception period which includes a request period in which the coordinator may transmit a signal to each of the sensor nodes, a response period in which the sensor node may transmit a signal to the coordinator or another sensor node, and an inactive period which is indicative of the end of the data transmission/reception period.

Further, it is preferable that the (c) and (e) be performed during the response period.

Further, a wireless communication method for a magnetic field communication network, the wireless communication method being performed by at least one sensor node on the magnetic field communication network, the wireless communication method, includes (a) receiving a request signal which is transmitted from a coordinator and which is used to request a response; (b) transmitting a response signal to the coordinator when the request signal is received; and (c) transmitting the response signal again when an acknowledgement signal is not received from the coordinator. Further, it is preferable that the (b) and (c) be performed during the response period.

Further, the sensor node may transmit/receive data to/from the coordinator during the inactive period.

Further, a demodulation device of a coordinator for a magnetic field communication network includes a clock generation unit for generating a clock signal; a mixing unit for mixing a node signal received from a sensor node with the clock signal; an integration unit for integrating a resulting signal on which mixing was performed; and a data operation unit for comparing a current integration value which is the result of the integration with an integration value, which was obtained prior to the current integration value, in every ½ data symbol period of the resulting signal, and determining output data based on the result of the comparison.

Advantageous Effects

According to the present invention, using the characteristics of a magnetic field and the demodulation method of a coordinator, a coordinator can detect multiple signals when multiple nodes simultaneously respond to a coordinator. Therefore, reliable communication can be realized in harsh environments using the magnetic field communication network without worrying about signal collision among the multiple nodes. Further, since the coordinator performs selective reception of node's data, it can receive data from multiple nodes efficiently in a short time.

DETAILED DESCRIPTION OF SPECIFIC EMBODIMENTS

Best Mode

Mode for Invention

A wireless communication method for a magnetic field communication network and the demodulation device of a coordinator will be described in detail below with reference to the attached drawings according to preferred embodiments of the present invention.

Figure 1:
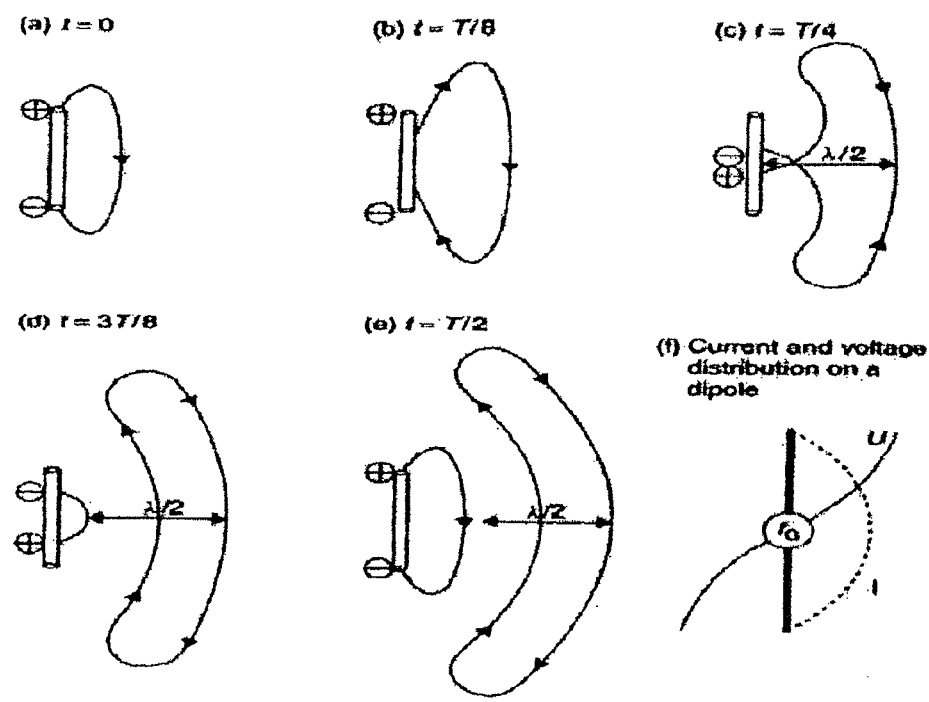
FIG. 1 is a view illustrating the generation principle of electromagnetic waves.
Figure 2:
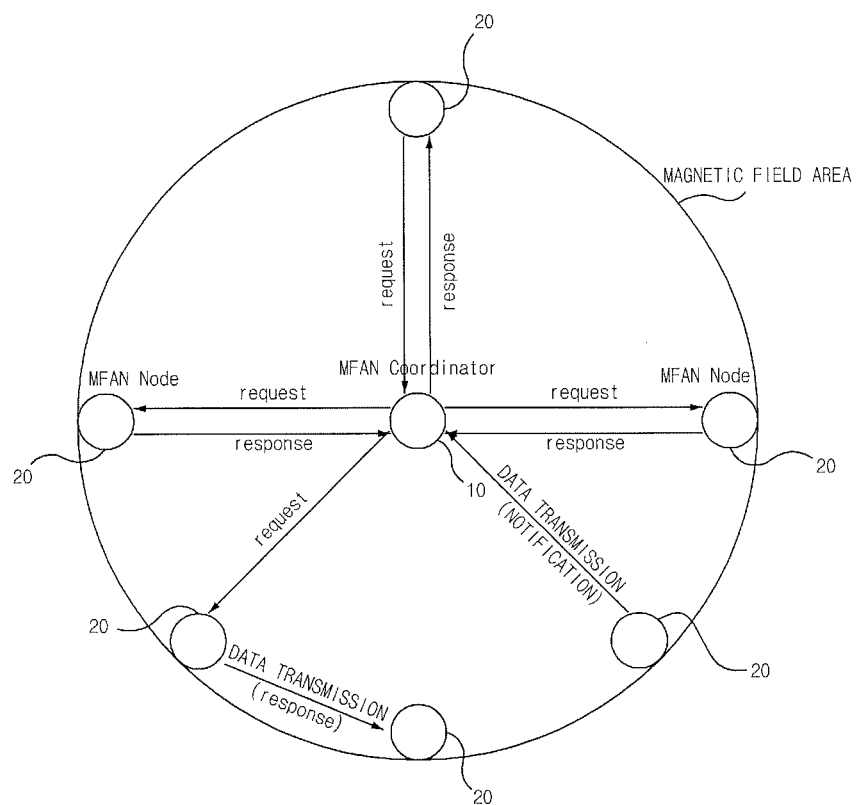
FIG. 2 is a view illustrating the structure of a magnetic field communication network according to an embodiment of the present invention.

FIG. 2 is a view illustrating the structure of a Magnetic Field Area Network (MFAN) according to an embodiment of the present invention.

In FIG. 2, a coordinator (MFAN Coordinator (MFAN-C)) 10 communicates with sensor nodes (MFAN Nodes (MFAN-Ns)) which are at a distance of $d(\lambda/2\pi)$ from the coordinator 10, that is, sensor nodes (MFAN-Ns) which are in the magnetic field area, and manages data transmission/reception periods. Further, communications between sensor nodes 20 are possible. Further, although devices which participate in a magnetic field communication network are divided into a coordinator (hereinafter referred to as a leader) and sensor nodes based on the functions thereof, each device may function as both a leader and a sensor node.

As shown in FIG. 2, when a coordinator transmits a response request packet, each of sensor nodes transmits a response packet, and the coordinator which received the response packet instantly transmits a acknowledgement packet. Further, when the coordinator transmits a data response request packet, a corresponding sensor node transmits a data response packet to a target node, and the target node which received the data response packet instantly transmits a acknowledgement packet. Further, a sensor node can transmit a data packet first without the response request packet of a coordinator in an emergency situation (for example, the detection of a landslide). Here, the coordinator (or the sensor node) which received the data packet transmits a acknowledgement packet.

Figure 3:
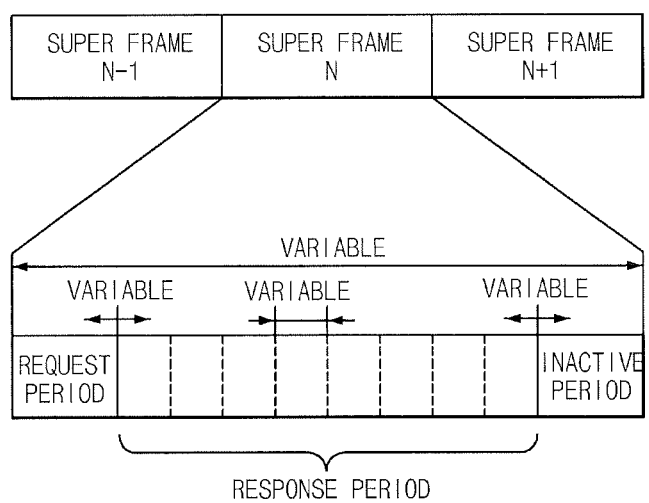
FIG. 3 is a view illustrating the structure of a data transmission/reception period according to the embodiment of the present invention.

FIG. 3 is a view illustrating the structure of a data transmission/reception period according to the present invention.

As shown in FIG. 3, a data transmission/reception period according to the present invention includes a request period, a response period, and an inactive period. The request period is the time period in which the coordinator transmits a response request packet. The response period is the time period in which each of sensor nodes can transmit a response packet at the response request of the coordinator, and the response period can be divided into several time slots based on the number of sensor nodes included in a network. Here, the length of each of the time slots is variable depending on the length of a response packet and the length of a acknowledgement packet. Further, the inactive period is the time period indicative of the end of the data transmission/reception period. Generally, in the case of the inactive period, no sensor node transmits data. Exceptionally, when an emergency situation has occurred and in the case of the inactive period, a data packet can be transmitted to a coordinator (or another sensor node). Further, the inactive period continues until the coordinator transmits a request packet.

Figures 4, 5:
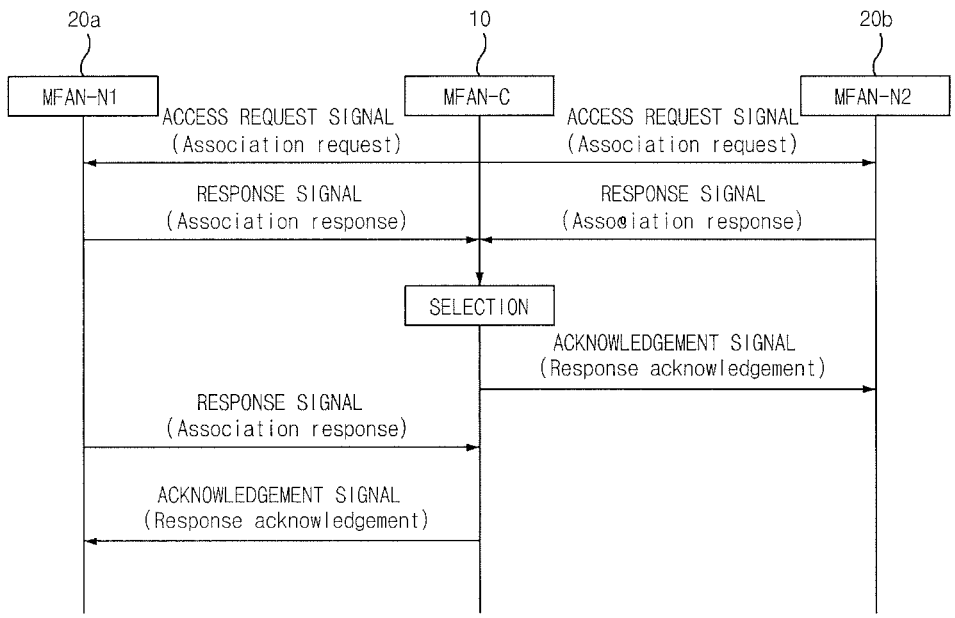
FIG. 4 is a view illustrating the structure of a frame according to the present invention.
FIG. 5 is a flow chart illustrating a wireless communication method for a magnetic field communication network according to an embodiment of the present invention.

FIG. 4 is a view illustrating the structure of a frame according to the present invention.

As shown in FIG. 4, the structure of a frame according to the present invention includes a unique magnetic field area network Identification (MFAN ID) field, a frame control field, a field indicative of a source node ID to which data is transmitted, a field indicative of a destination node ID at which data is received, a packet number (sequence number) field, a payload field, and an error check field (Frame Check Sequence (FCS)).

Here, the frame control field includes a frame type, a acknowledgement method, a first fragment packet display, a last fragment packet display, and a protocol version.

FIG. 5 is a flow chart illustrating a wireless communication method for a magnetic field communication network according to an embodiment of the present invention.

First, when a leader 10 transmits a association response packet during a request period in order to check sensor nodes included in the magnetic field area network or to allocate node IDs to the sensor nodes in the magnetic field area network, all the sensor nodes in the corresponding magnetic field area network transmit response packets to the leader 10.

Thereafter, the leader 10 selects any one of the response packets received from the sensor nodes, and transmits an acknowledgement packet to a sensor node 20b which corresponds to the selected response packet. Here, the acknowledgement packet may include the ID information about the corresponding sensor node. Further, it is preferable that the acknowledgement packet be transmitted during the response period.

Meanwhile, although the sensor node which received the acknowledgement packet does not transmit a response packet any more, the other sensor nodes transmit response packets again. That is, even though a sensor node transmitted a response packet, the sensor node transmits a response packet again if the sensor node does not receive an acknowledgement packet for a predetermined time after the sensor node transmitted the response packet.

Therefore, the leader 10 selects any one of the response packets transmitted again, and transmits an acknowledgement packet to a sensor node 20a which corresponds to the selected response packet. It is also preferable that the acknowledgement packet be transmitted during the response period.

Based on the wireless communication method according to the embodiment of the present invention, all the sensor nodes in the magnetic field area network may have complete access to the leader 10.

Figure 6:
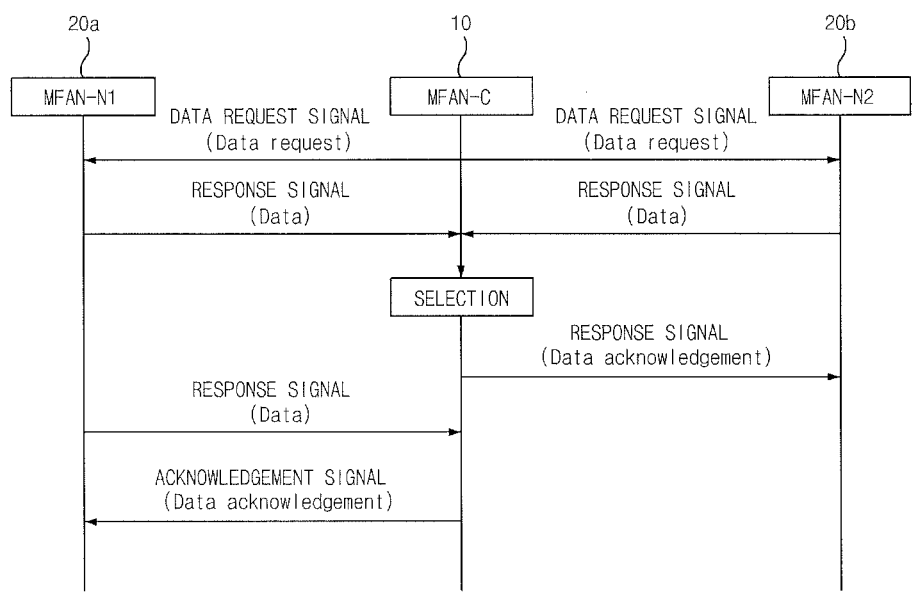
FIG. 6 is a flow chart illustrating a wireless communication method for a magnetic field communication network according to another embodiment of the present invention.

FIG. 6 is a flow chart illustrating a wireless communication method for a magnetic field communication network according to another embodiment of the present invention.

After the above-described access process has completed, if the leader 10 transmits a data request packet which requests the sensing data, all the sensor nodes in the corresponding magnetic field area network transmit response packets (each including the sensing data) to the leader 10.

Thereafter, the leader 10 selects any one of the response packets received from the sensor nodes, and transmits an acknowledgement packet to a sensor node 20b which corresponds to the selected response packet. Here, it is also preferable that the acknowledgement packet be transmitted during the response period.

Meanwhile, although the sensor node which received the acknowledgement packet does not transmit the response packet anymore, the other sensor nodes transmit the response packets again. Thereafter, the leader 10 selects any one of the response packets transmitted again, and transmits an acknowledgement packet to the sensor node 20a which corresponds to the selected response packet. Here, it is also preferable that the acknowledgement packet be transmitted during the response period.

According to the wireless communication method of the present invention, the leader 10 can receive data from the all the sensor nodes in the magnetic field area network.

Figure 7:
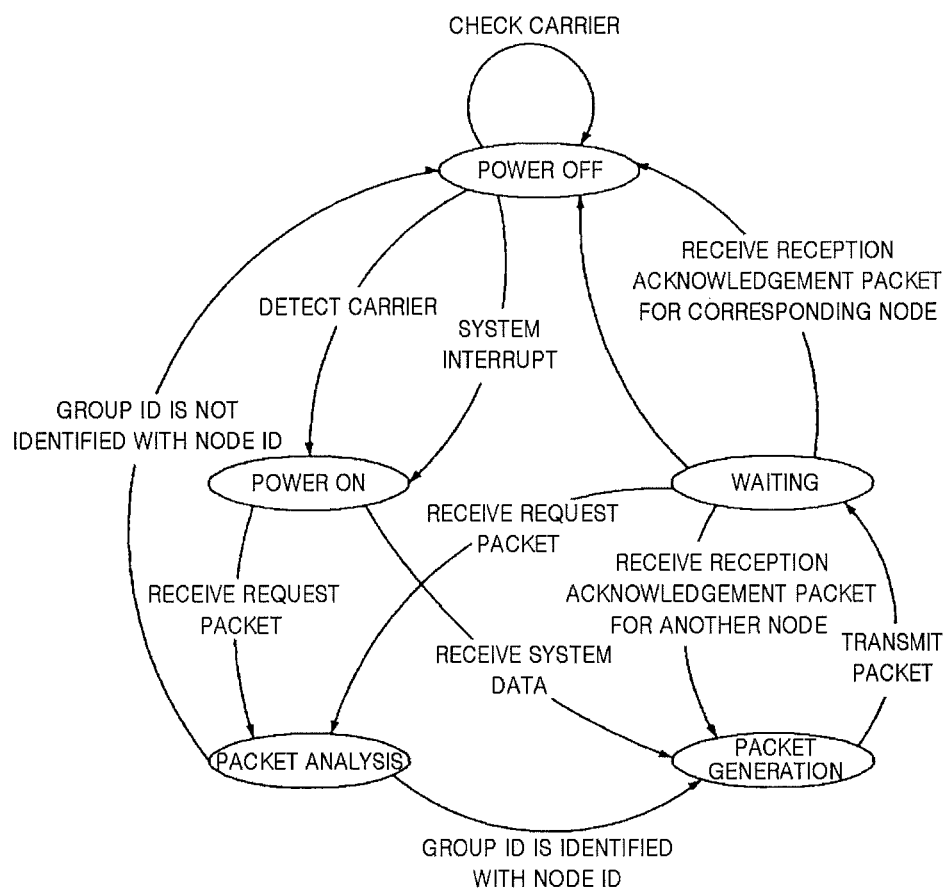
FIG. 7 is a state diagram for sensor nodes according to the present invention.

FIG. 7 is a state diagram for a sensor node according to the present invention.

As shown in FIG. 7, a sensor node according to the present invention is turned on using the power of an RF signal (carrier signal) transmitted from the leader 10. When a request packet is received in such power-on status, the received request packet is analyzed. If, as the result of analysis, its group ID or node ID are not matched with them in the request packet, power is turned off. If its group ID and node ID are matched with them, a response packet is generated and then transmitted to the leader 10. If, after transmission, the sensor node receives an acknowledgement packet related thereto from the leader 10 in a waiting state, power is turned off. If the sensor node receives an acknowledgement packet related to another sensor node, the sensor node generates a response packet again and then transmits the generated response packet. If the sensor node does not receive the acknowledgement packet during a predetermined time in the waiting state, the power is turned off naturally. Further, if the request packet is received in a waiting state, the state is changed to a packet analysis state and the response period starts again.

Meanwhile, a system connected to the sensor node generates an interrupt when an emergency situation occurs, power is turned on. If data is received from the system here, the sensor node generates a data packet and then transmits the generated data packet to the leader 10 or other sensor nodes.

Figure 8:
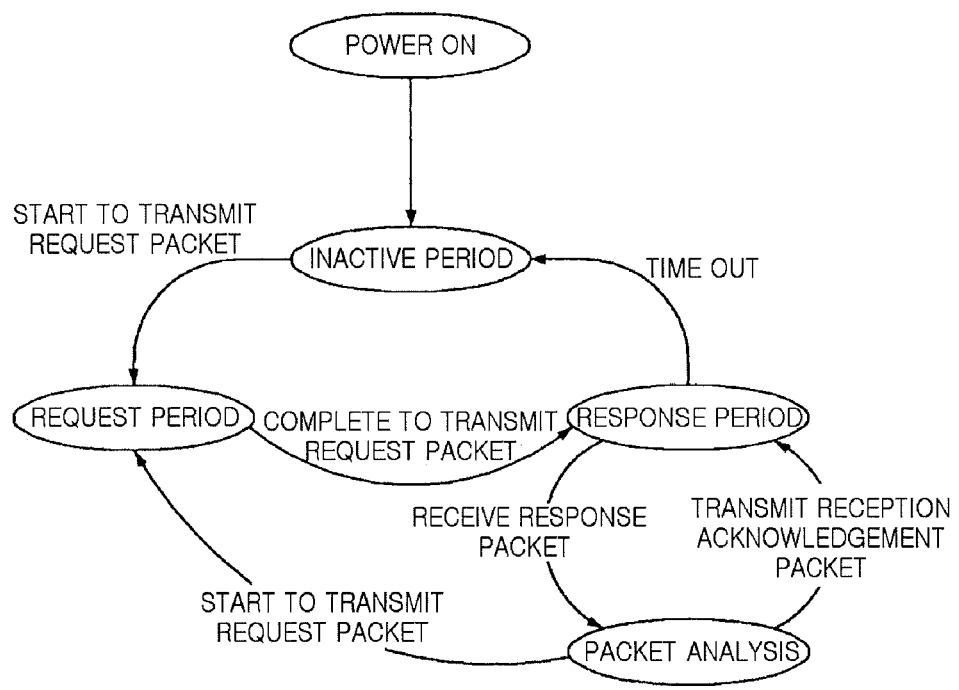
FIG. 8 is a state diagram for a coordinator according to the present invention.

FIG. 8 is a state diagram of a coordinator according to the present invention.

As shown in FIG. 8, the leader 10 according to the present invention receives a command, which provides notification that a request packet should be transmitted, from a host computer (not shown) during an inactive period. According to such a transmission command, the leader transmits a request packet to sensor nodes. Thereafter, when response packets are received from the sensor nodes, the leader analyzes the received response packets and then transmits acknowledgement packets to the sensor nodes. Thereafter, if no sensor node transmits a response packet, the state is changed to an inactive period state. Meanwhile, when packets requested by the leader 10 are transmitted in a packet analysis state, a super frame starts again.

A method of a coordinator selecting any one of several response packets according to the present invention will be described in more detail below with reference to FIGS. 9 to 18.

Figure 9:
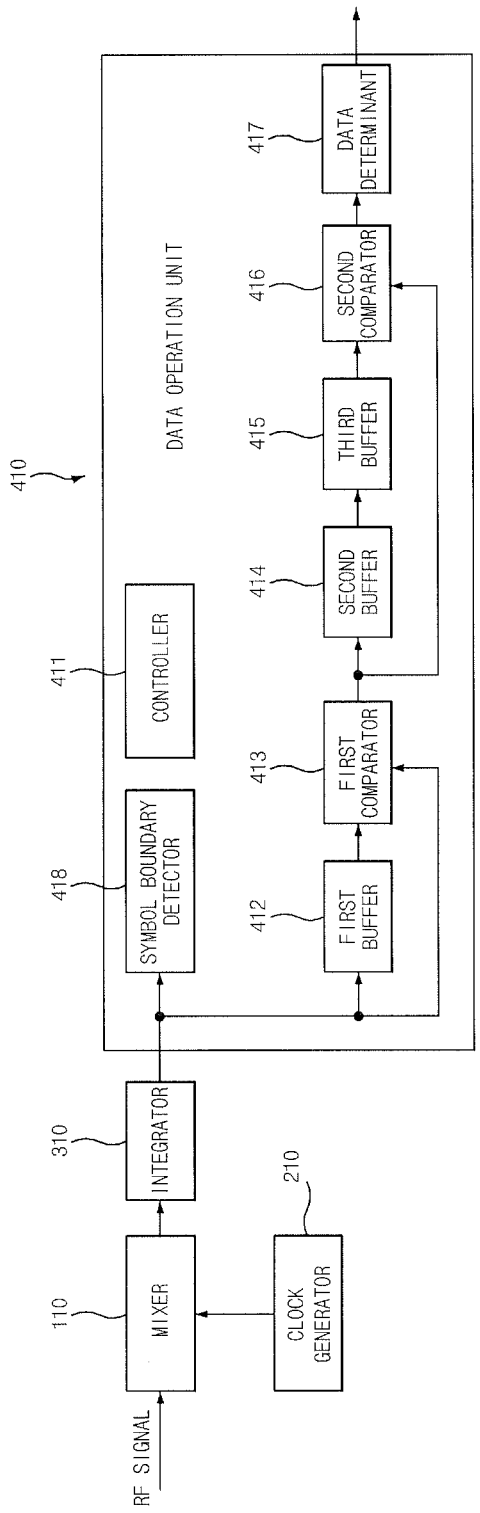
FIG. 9 is a block diagram illustrating the demodulation device of a coordinator for a magnetic field communication network according to an embodiment of the present invention.
Figure 10:
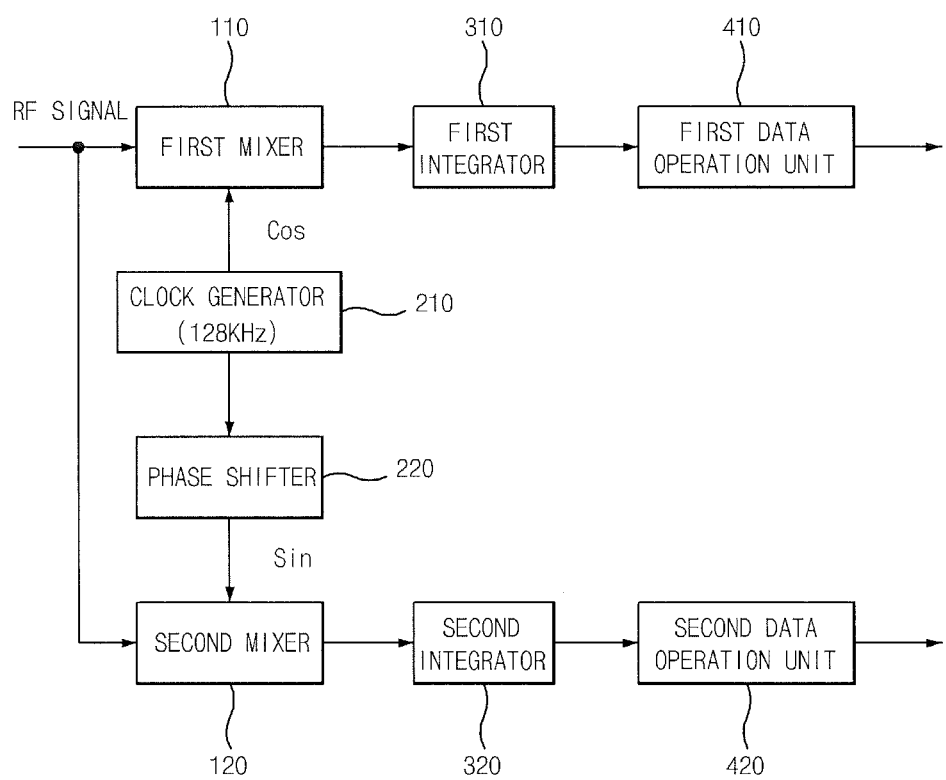
FIG. 10 is a diagram illustrating the demodulation device of a coordinator for a magnetic field communication network according to another embodiment of the present invention.

FIG. 9 is a block diagram illustrating the demodulation device of a coordinator for a magnetic field communication network according to an embodiment of the present invention, and FIG. 10 is a diagram illustrating the demodulation device of a coordinator for a magnetic field communication network according to another embodiment of the present invention.

As shown in FIG. 9, a demodulation device according to an embodiment of the present invention includes a mixer 110, a clock generator 210, an integrator 310, and a data operation unit 410.

Meanwhile, as shown in FIG. 10, a demodulation device according to another embodiment of the present invention includes first and second mixers 110 and 120, a clock generator 210, first and second integrators 310 and 320, and first and second data operation units 410 and 420.

The clock generator 210 generates a CW signal (clock signal).

Each of the mixers 110 and 120 receives a CW signal and an RF signal (for example, an ASK signal) from a node, mixes them, and then outputs a resulting signal. Here, the phase difference between the CW signals to be input to the first mixer 110 and the second mixer 120 is 90°. That is, the CW signal (hereinafter referred to as a CW-1 signal) is directly input to the first mixer 110, and a CW signal (hereinafter referred to as a CW-2 signal) in which the phase is shifted through a 90° phase shifter 220 is input to the second mixer 120. Here, the bit data of the RF signal to be input to each of the mixers 110 and 120 is a signal encoded using an FM0 method or a miller method.

Each of the integrators 310 and 320 integrates the resulting signal on which mixing was performed by the corresponding mixer. Here, an integration value obtained using each of the integrators is most affected by the RF signal which was received from the node and has the lowest phase difference between the corresponding signal and an input reference signal. The integration of each of the integrators 310 and 320 is performed every ½ period of a data symbol.

The data operation unit 410 and 420 stores the signal on which integration is performed using each of the integrators 310 and 320, operates the change in the signal values obtained through integration in every predetermined symbol period, and then determines output data. The data operation unit includes a controller 411, a symbol boundary detector 418, a first buffer 412, a first comparator 413, a second buffer 414, a third buffer 415, a second comparator 416 and a data determinant 417.

The symbol boundary detector 418 detects the ½ period of a data symbol.

The integration value of the integrator 310 is stored in the first buffer 412 in every ½ symbol period, and each of the buffers 412, 414, and 415 stores data in every ½ symbol period.

The first comparator 413 compares the integration value stored in the first buffer 412 with the integration value of the current integrator 310 in every ½ symbol period, and then outputs a sign value.

The second comparator 416 compares the resulting sign value (that is, the resulting sign value of the first comparator, which was output prior to one symbol period) of the first comparator stored in the third buffer 415 with the resulting sign value of the current first comparator 413 in every 1 symbol period.

The controller 411 performs control such that the integrator 310, the comparators 414 and 415, and buffers 413, 415, and 416 operate in every ½ period of the data symbol detected using the symbol boundary detector 418. Further, the controller 411 includes a state machine (not shown) for determining a data comparison time point of the first comparator 413 and the second comparator 416.

The data determinant 417 determines data based on the comparison results obtained using the second comparator 416. For example, when bit data is an RF signal on which FM0 encoding is performed, the data determinant 417 outputs '0' if two values (the resulting sign value of the current first comparator and the resulting sign value of the first comparator, which was obtained prior to one symbol period) are the same, otherwise, outputs '1' if two values are different from each other based on the comparison results obtained using the second comparator 416.

When the bit data is an RF signal on which miller encoding is performed, the data determinant 417 outputs '1' if two values (the resulting sign value of the current first comparator and the resulting sign value of the first comparator, which was obtained prior to one symbol period) are the same, otherwise, outputs '0' if the two values are different from each other based on the comparison results obtained using the second comparator 416.

Figure 11:
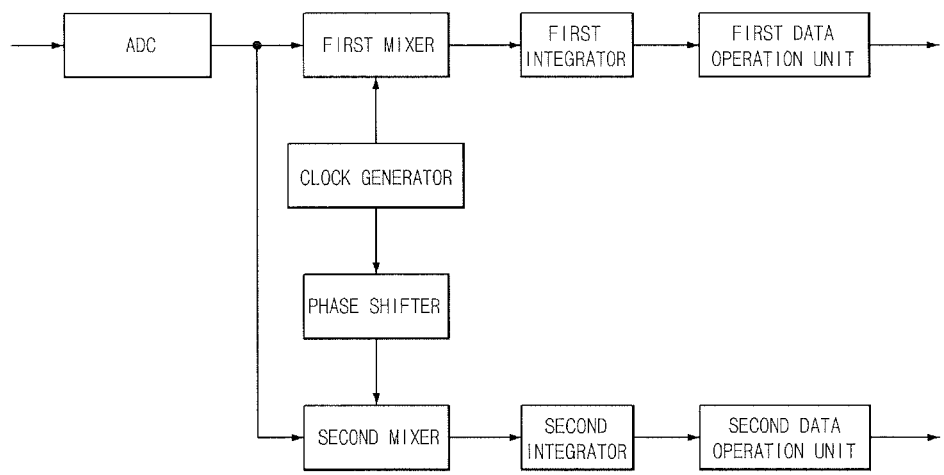
FIGS. 11 and 12 are diagrams illustrating the demodulation devices of a coordinator for a magnetic field communication network according to a further another embodiment of the present invention.
Figure 12:
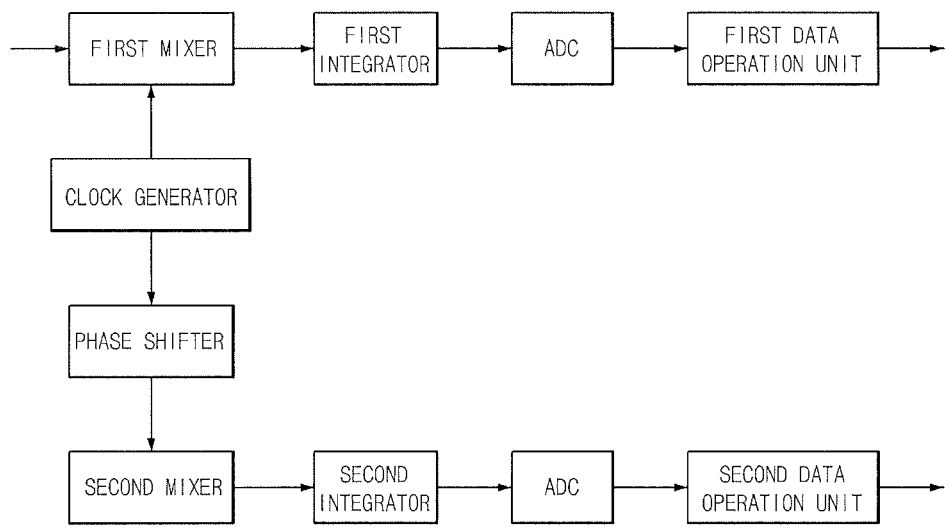

FIGS. 11 and 12 are diagrams illustrating demodulation devices each according to further another embodiment of the present invention, and each of the demodulation devices each according to further another embodiment of the present invention may further include an AD Converter (ADC).

The embodiments of the demodulation devices according to the present invention will be described in detail below with reference to FIGS. 13 to 17.

Figure 13:
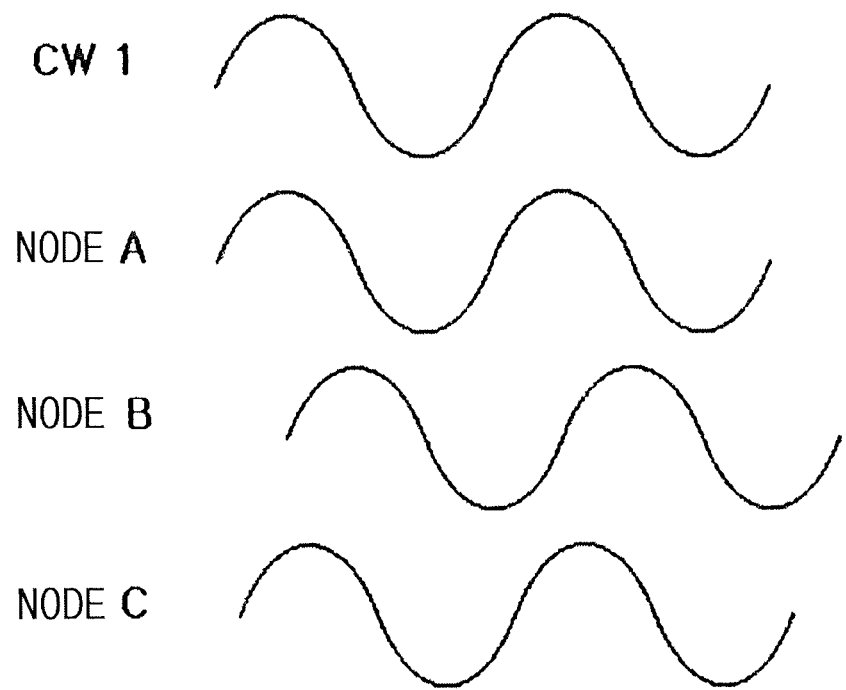
FIG. 13 is a graph illustrating the carrier wave signals of response signals obtained when nodes A, B, and C simultaneously respond.

FIG. 13 is a graph illustrating the carrier wave signals of respective response signals obtained when nodes A, B, and C simultaneously respond. Here, the response signals of the respective nodes A, B, and C are signals on which FM0 encoding and ASK modulation were performed.

As shown in FIG. 13, the phase of the carrier wave signal (Node A) of node A is identical with the phase of the CW-1 signal generated using the clock generator 210, the carrier wave signal (Node B) of node B is identical with the CW-2 signal on which the phase is shifted by 90° using the phase shifter 220, and the carrier wave signal (Node C) of node C is a signal in which the phase difference related to the CW-1 is smaller than the phase difference related to the CW-2. Further, the amplitudes of the carrier wave signals of the three nodes are the same. In this case, a signal $I_1$ which is input to the first integrator 310 is a signal represented by the following Equation 1, and a signal I2 which is input to the second integrator 320 is a signal represented by the following Equation 2:

$$I_1 = (NodeA + NodeC)sCW1 \quad (1)$$

$$I_2 = (NodeB + NodeC)sCW2 \quad (2)$$

Figure 14:
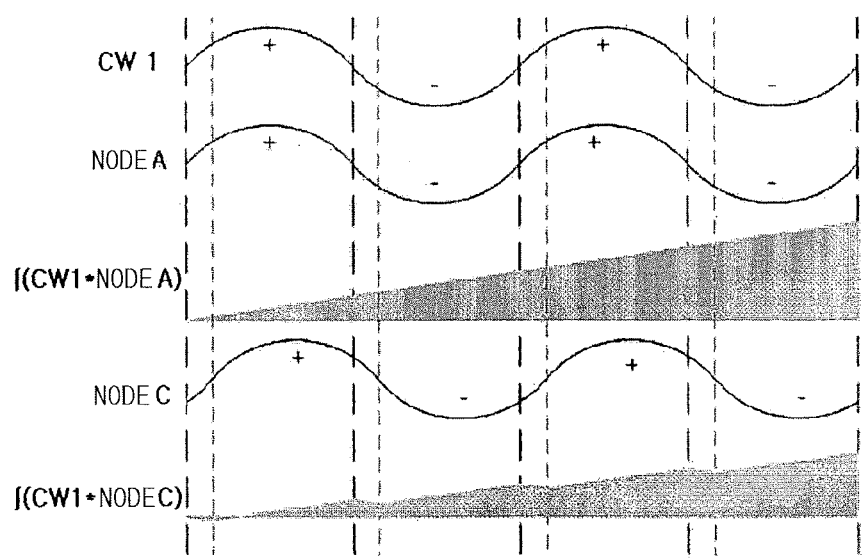
FIG. 14 is a graph illustrating the integration value of a first integrator which received an I1 signal.

FIG. 14 is a graph illustrating the integration value obtained using the first integrator which received the signal $I_1$.

As shown in FIG. 14, since the phase difference between the signal (Node C) of node C and the CW-1 is larger than the phase difference between the signal (Node A) of node A and the CW-1, the integration value of a (Node C*CW-1) signal is smaller than the integration value of a (Node A*CW-1) signal.

Figure 15:
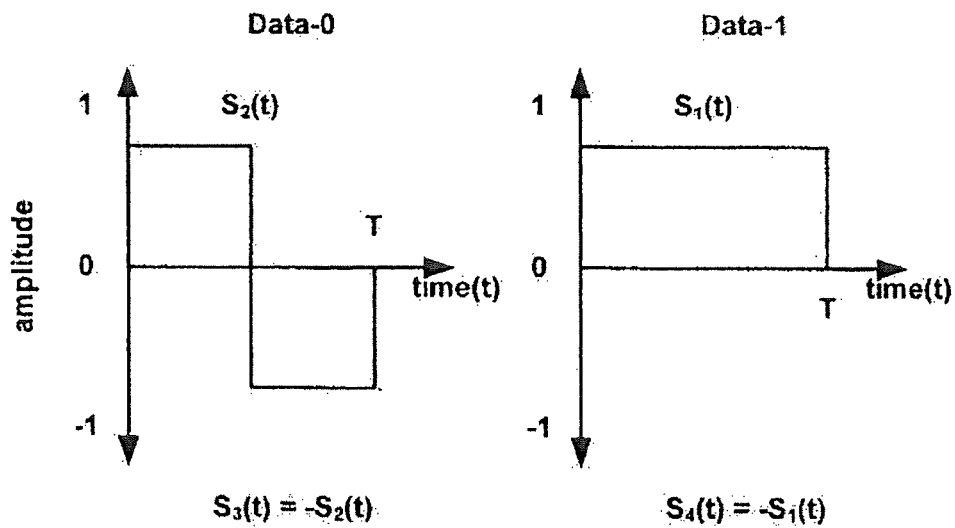
FIG. 15 shows graphs illustrating basic functions of an FM0 encoding signal.
Figure 16:
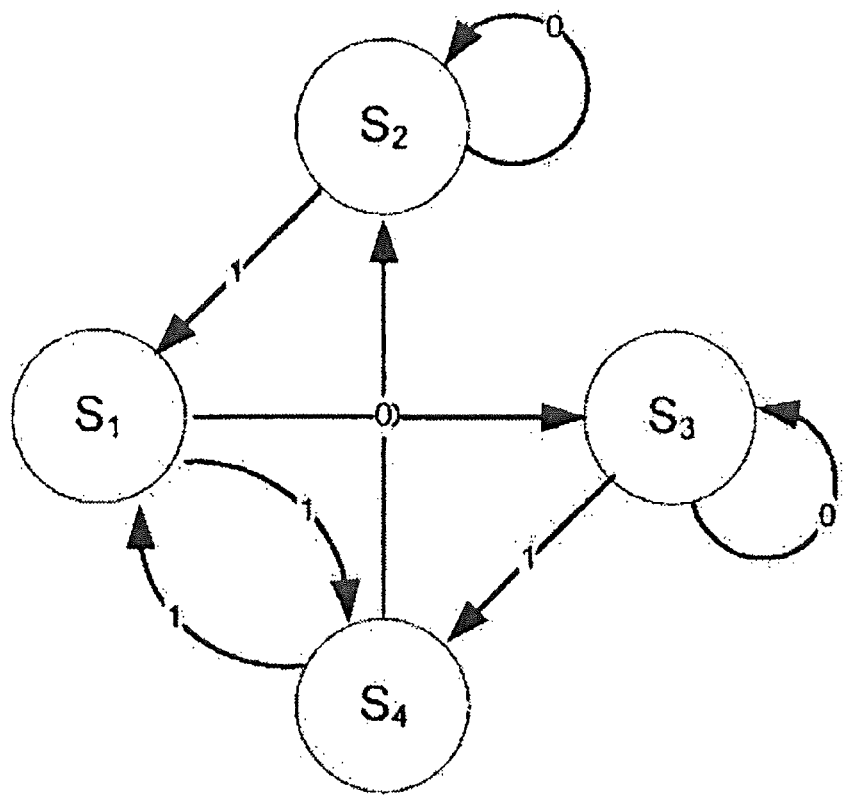
FIG. 16 is a state diagram of the FM0 encoding signal.

FIG. 15 is a graph illustrating the basic function of an FM0 encoding signal, and FIG. 16 is a state diagram of the FM0 encoding signal.

As shown in FIG. 15, the signal level of the FM0 encoding signal changes at the start of the entire symbol. Further, when data is '0', the signal level thereof changes one more time in the middle of a symbol.

With regard to such characteristic of a signal, the present invention compares the results of increase/decrease in the integration value in every ½ symbol period.

Figure 17:
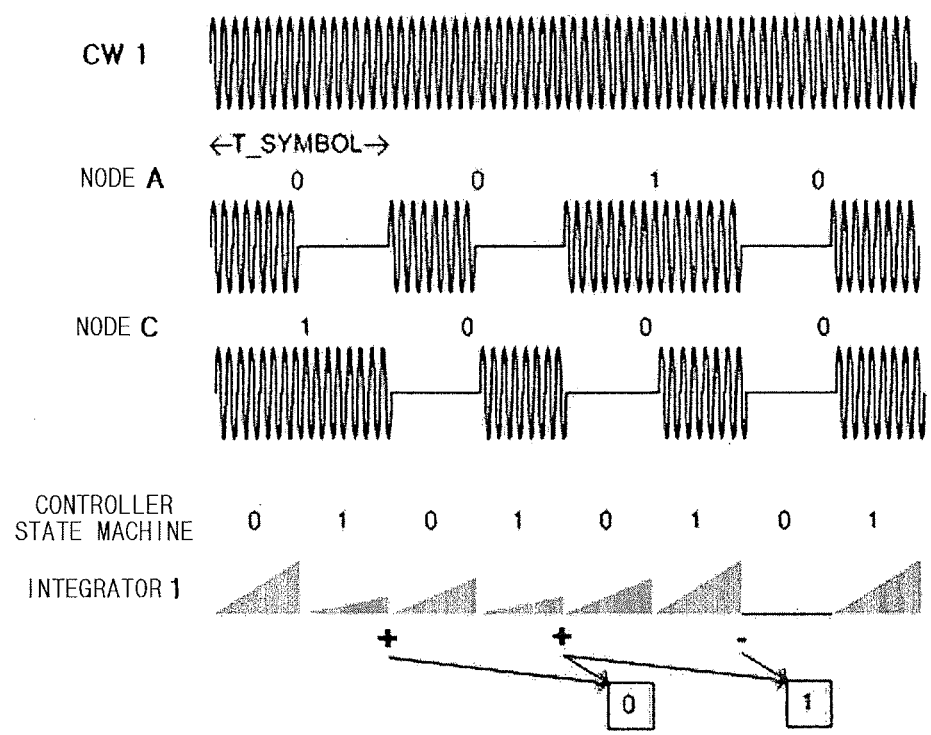
FIG. 17 is a view schematically illustrating signals of an integrator and a state machine according to an embodiment of the present invention.

FIG. 17 is a view schematically illustrating signals of an integrator and a state machine according to an embodiment of the present invention.

In the embodiment below, node A transmits data '0010', and node C transmits data '1000'. Further, for the sake of an easy explanation, an embodiment will be described based on 100% ASK modulation and 16 N_Carriers (the number of carriers for one symbol). However, the index of the ASK modulation and the value of the N_Carrier according to the present invention are not limited thereto.

As shown in FIG. 17, when the signals of node A and node C are input, the value of the state machine (not shown) of the controller 411 is shifted by one symbol interval.

When the value of the state machine is 0, the first comparator 413 compares the current integration value of the integrator 310 with the integration value stored in the first buffer 412 and stores a resulting sign. At the first symbol, the current integration value is larger, '+' is stored in the second buffer 414.

Thereafter, when the value of the state machine is 0, the first comparator 413 compares the current integration value of the integrator 310 with the integration value stored in the first buffer 412. As a result of the comparison, a sign value is a '+' value and the '+' value is stored in the second buffer 414. The value which was stored in the second buffer 414 is transmitted to the third buffer 415 whenever the value of the state machine changes, that is, at every ½ symbol.

The second comparator 416 compares the current sign value of the first comparator 414 with the sign value of the first comparator 414, which was stored prior to one symbol (this value is currently stored in the third buffer 415). As a result of the comparison, the data determinant 417 performs decoding using '0' because two values are the same.

After repeating such steps, when the value of the state machine is '0' again, the second comparator 416 compares the two values. Since the current sign value is '−' and the sign value which was obtained prior to one symbol is '+', decoding is performed using '1' even if the two sign values are different from each other.

While the above-described steps are repeated, the first data operation unit 410 decodes the signal of node A.

As described above, decoding is performed in such a way as to compare the increase/decrease in the integration values at the boundary of a symbol in the present invention, so that the biggest signal can be selected and decoded even when several nodes simultaneously respond and signals overlap.

Further, the same as in the above-described procedure, the signal of node B is decoded using the second integrator 320 and the second data operation unit 420. Therefore, even when two node signals are simultaneously received, they can be distinguished from each other and can be decoded.

Figure 18:
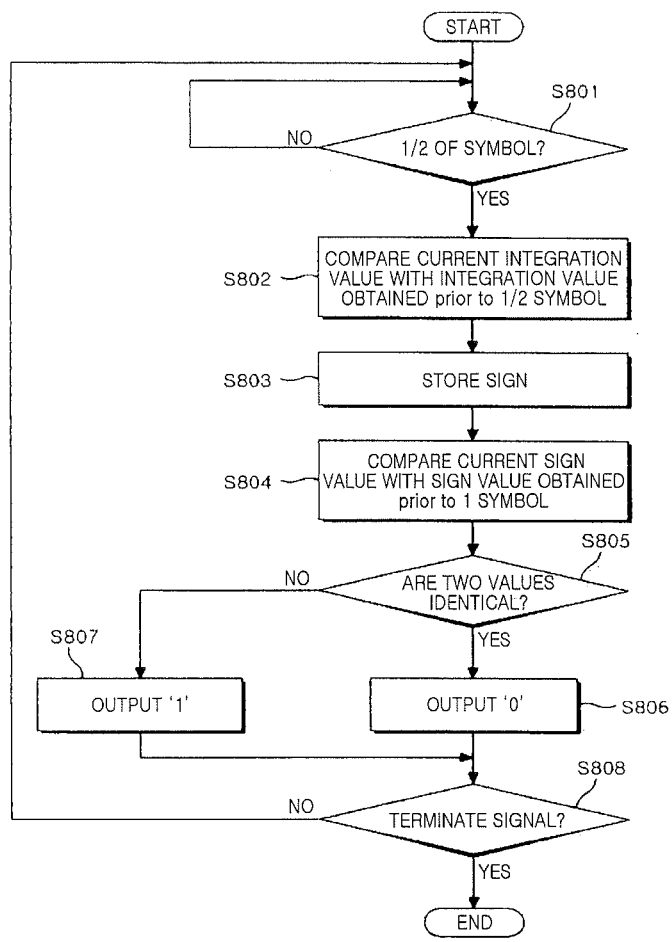
FIG. 18 is a flowchart illustrating a demodulation method according to an embodiment of the present invention.

FIG. 18 is a flowchart illustrating a demodulation method according to an embodiment of the present invention.

As shown in FIG. 18, the demodulation method according to the present invention includes mixing, integrating, and data operating steps.

The mixer 110 receives a CW signal and an RF signal, and then mixes the two signals.

The integrator 310 integrates a resulting signal on which mixing was performed using the mixer.

The first comparator 413 compares the integration value obtained at a current integration step and the integration value obtained at a previous integration step in every ½ symbol period at step S802, and determines and stores a sign value at step S803.

The second comparator 416 compares the current sign value of the first comparator with the sign value of the first comparator, which was obtained prior to one symbol period at step S804.

Based on a result of comparison obtained at the second comparison step performed using the second comparator 416, the data determinant 417 sets output data to '0' if the two values are the same at step S806, or sets the output data to '1' if the two values are different from each other at step S807.

The above-described procedure is performed in every ½ symbol period detected using the symbol boundary detector 418 at step S801, and the procedure is performed until the end of the input signal at step S808.

In every predetermined symbol period, a comparison step in which the integration value of the current integration step is compared with the integration value, which was obtained at the previous integration step, and a data determination step in which output data is determined based on the result of the comparison are included. The comparison step and the data determination step are performed in every ½ symbol period detected at the symbol boundary detection step.

The wireless communication method for a magnetic field communication network and the demodulation device for a coordinator according to the present invention are not limited to the above-described embodiments, and can be modified and executed in various manners in the scope of the technical spirit of the present invention.

What is claimed is:

1. A wireless communication method for a magnetic field communication network, the wireless communication method being performed by a coordinator on the magnetic field communication network, the wireless communication method comprising:
   (a) transmitting to a plurality of sensor nodes a request signal to request a response from each of the plurality of sensor nodes;
   (b) selecting any one of a plurality of response signals received from the plurality of sensor nodes;
   (c) transmitting an acknowledgement signal to a sensor node corresponding to the response signal selected at (b);
   (d) selecting any one of response signals transmitted again from remaining sensor nodes, among the plurality of sensor nodes, which did not receive the acknowledgement signal at (c); and
   (e) transmitting an acknowledgement signal to a sensor node corresponding to the response signal selected at (d),
   wherein in (d), the response signals are transmitted again from the remaining sensor nodes to the coordinator even when there is no additional request signal from the coordinator to the remaining sensor nodes to request a response from the remaining sensor nodes.

2. The wireless communication method as set forth in claim 1, wherein (b) comprises:
   producing a signal by mixing a clock signal of the coordinator with a response signal received from a corresponding sensor node among the plurality of sensor nodes;
   integrating the mixed signal to produce a present integration value;
   comparing the present integration value with an integration value stored previous to the present integration value in every ½ data symbol period of the mixed signal; and
   determining output data based on a result of the comparing.

3. The wireless communication method as set forth in claim 2, wherein transmitting the request signal in (a) is performed during a request period of a data transmission/reception period, which transmission/reception period comprises:
   the request period in which the coordinator transmits the request signal to each of the plurality of sensor nodes;
   a response period in which each of the sensor nodes transmits a signal to the coordinator or another sensor node, and;
   an inactive period which is indicative of an end of the data transmission/reception period.

4. The wireless communication method as set forth in claim 3, wherein transmitting the acknowledgement signals to the sensor nodes in (c) and (e) are performed during the response period.

5. The wireless communication method as set forth in claim 3, wherein the acknowledgement signal comprises information about an identification of the sensor node corresponding to the response signal selected in (b) or (d).

6. The wireless communication method as set forth in claim 1, wherein the request signal requesting the response in (a) is an association request signal requesting association between the coordinator and each of the plurality of sensor nodes.

7. The wireless communication method as set forth in claim 1, wherein the request signal requesting the response in (a) is a data request signal requesting data from each of the plurality of sensor nodes.

8. A wireless communication method for a magnetic field communication network, the wireless communication method being performed by at least one sensor node on the magnetic field communication network, the wireless communication method, comprising:
   (a) receiving a request signal which is transmitted from a coordinator to request a response from the at least one sensor node;
   (b) transmitting a response signal to the coordinator in response to the request signal; and (c) transmitting the response signal again when an acknowledgement signal in response to the transmitting in (b) is not received from the coordinator, wherein (b) and (c) are performed during a response period of a data transmission/reception period, wherein in (c), the response signal is transmitted again from the at least one sensor node to the coordinator even when there is no additional request signal from the coordinator to the at least one sensor node to request a response from the at least one sensor node, and wherein the data transmission/reception period comprises:

a request period in which the coordinator transmits the request signal to the at least one sensor node:

the response period in which each of the at least one sensor node transmits the response signal to the coordinator or another sensor node, and;

an inactive period which indicates an end of the data transmission/reception period.

9. The wireless communication method as set forth in claim 8, wherein the at least one sensor node transmits and receives data to and from the coordinator, respectively, during the inactive period.

10. The wireless communication method as set forth in claim 8, wherein the request signal to request the response in (a) is an association request signal requesting association between the coordinator and the at least one sensor node.

11. The wireless communication method as set forth in claim 8, wherein the request signal to request the response in (a) is a data request signal requesting data from the at least one sensor node.

* * * * *